Patented July 9, 1929.

1,720,065

UNITED STATES PATENT OFFICE.

GUSTAAF VERDICKT, OF GHENT, BELGIUM.

METAL PACKING.

No Drawing. Application filed October 22, 1927. Serial No. 228,077.

This invention relates to a new alloy for metal packings for joints, and the applications of same.

The new alloy is especially composed for obtaining a packing capable of resisting high temperatures and pressures especially in steam pipings.

The packing can be applied to valve cocks of known type.

The troubles caused by the use of ebonite packings are well known. The new packing consists of an alloy which is less hard than the metal of the cock, but can resist the action of steam at 290° C. and a pressure of 65 atm. Said alloy is made of 5 parts lead, 1 part antimony and ¼ part zinc. The proportion of said constituents may be somewhat modified, but the named one gives the best results.

It has been found that such a packing resists not only to high temperatures and pressures, but also the action of acids which may be contained in the steam, and has the advantage of never splitting or breaking along the edge, nor crumbling to pieces at the points of highest pressure. This prevents obstruction of the piping.

The new alloy can also be used for gaskets, for instance in flange joints of steam pipings, as substitute for the ordinary asbestos or klingerit and the like packings. Owing to the hardness of the alloy being lower than the hardness of the joined metal parts, said latter force their way into the packing, thereby ensuring a most perfect tightness.

I claim:

1. Alloy for joint packings and the like, composed of 5 parts lead, 1 part antimony and ¼ part zinc.

2. As a new article of manufacture, a gasket for making joints for valve-cocks, pipes, and the like made of an alloy composed of 5 parts lead, 1 part antimony and ¼ part zinc.

In testimony whereof I sign hereunto my name.

GUSTAAF VERDICKT.